United States Patent
Becker et al.

(10) Patent No.: US 9,297,362 B2
(45) Date of Patent: Mar. 29, 2016

(54) SWITCHGEAR FOR AN OFFSHORE WIND TURBINE

(75) Inventors: Marco Becker, Mannheim (DE); Stefan Kämpfer, Mannheim (DE)

(73) Assignee: ABB TECHNOLOGY AG, Zurich (CH)

(*) Notice: Subject to any disclaimer, the term of this patent is extended or adjusted under 35 U.S.C. 154(b) by 690 days.

(21) Appl. No.: 13/566,681

(22) Filed: Aug. 3, 2012

(65) Prior Publication Data

US 2013/0026139 A1 Jan. 31, 2013

(30) Foreign Application Priority Data

Feb. 5, 2010 (DE) .......................... 10 2010 007 136

(51) Int. Cl.
| | |
|---|---|
| *H02B 7/00* | (2006.01) |
| *H02B 13/00* | (2006.01) |
| *F03D 11/00* | (2006.01) |
| *F03D 11/04* | (2006.01) |
| *H02B 13/025* | (2006.01) |

(52) U.S. Cl.
CPC ................ *F03D 11/00* (2013.01); *F03D 11/04* (2013.01); *H02B 13/025* (2013.01); *Y02E 10/728* (2013.01)

(58) Field of Classification Search
None
See application file for complete search history.

(56) References Cited

U.S. PATENT DOCUMENTS

| 7,054,143 | B2 | 5/2006 | Eiselt et al. | |
|---|---|---|---|---|
| 7,615,884 | B2* | 11/2009 | McMaster | 290/55 |
| 8,698,342 | B2* | 4/2014 | Hirai et al. | 290/55 |
| 8,785,770 | B2* | 7/2014 | Gingrich | 174/17 VA |
| 2006/0050470 | A1* | 3/2006 | Eiselt et al. | 361/605 |
| 2011/0187119 | A1* | 8/2011 | McMaster | 290/55 |
| 2011/0233934 | A1* | 9/2011 | Crane et al. | 290/52 |

FOREIGN PATENT DOCUMENTS

| DE | 29 15 504 A1 | 10/1980 |
|---|---|---|
| EP | 0 620 626 A1 | 10/1994 |
| EP | 1 477 668 A1 | 11/2004 |
| WO | WO 98/19377 A1 | 5/1998 |

OTHER PUBLICATIONS

German Search Report dated Dec. 2, 2011.

* cited by examiner

*Primary Examiner* — Courtney Smith
(74) *Attorney, Agent, or Firm* — Buchanan Ingersoll & Rooney PC

(57) ABSTRACT

An exemplary wind turbine for providing electrical energy includes a tower having a turret and switchgear for switching an electric current. The switchgear is arranged in a housing in the turret. The wind turbine also includes a discharge chamber separate from the turret; and a pressure-relief device, which is connected between the interior of the housing and the discharge chamber, in order to relieve pressure when there is a pressure difference between the interior of the housing of the switchgear and the discharge chamber so that an overpressure in the discharge chamber can be dissipated.

9 Claims, 5 Drawing Sheets

SWITCHGEAR FOR AN OFFSHORE WIND TURBINE

RELATED APPLICATIONS

This application is a bypass continuation under 35 U.S.C. §120 of International application PCT/EP2011/000294 filed on Jan. 25, 2011, which designates the U.S. and claims 35 U.S.C. §119 priority to European Patent Application No. 10 2010 007 136.6 filed in Germany on Feb. 5, 2010, the contents of which is hereby incorporated by reference in their entireties.

FIELD

The disclosure relates to a switchgear, such as medium-voltage switchgear for performing load separation for offshore wind turbines.

BACKGROUND INFORMATION

In known offshore wind farms, the individual wind turbines are often connected to one another by a simple undersea cable. This arrangement provides that individual stretches of cable within a medium-voltage grid between individual wind turbines of large wind farms cannot be separated. The use of load separators in each wind turbine allows individual wind turbines to be separated from the medium-voltage grid. The wind turbines moreover have power switches in order to control the energy fed into the medium-voltage grid by the wind turbines.

Switchgear of this type (e.g., medium-voltage switchgear) can be provided inside a metal cabinet or housing that seals off the load separators and the power switches in a gastight fashion. In such medium-voltage switchgear, arc faults may form, for example in the case of a malfunction, which heat up the insulating gas and result in high temperatures and high pressures. Causes for the formation of arc faults may be, inter alia, insulation failure, excess voltage or improper operation by staff. The arc faults and resulting hot gases, which may in some cases be toxic, represent a high risk for people standing in the vicinity of the switchgear and for the switchgear itself.

Although metal-enclosed switchgear can withstand several hundred mbar of excess pressure, high internal pressures can cause damage. For these reasons, of such medium switchgear pressure can be relieved from the inside of the housing into the surroundings of the switchgear. To do this, a bursting disk, a pressure-relief valve or the like and possibly an absorbing device, situated in a side or rear housing wall or on the top of the housing, can be provided in the metal cabinet or housing for the switchgear.

When such medium-voltage switchgear is used in a wind turbine, hitherto two options have been known for effecting the pressure relief. Firstly, the pressure is relieved from the medium-voltage switchgear into the interior of a tower of the wind turbine. Any people present inside the tower can be put at risk as a result, and the inside of the tower should be cleaned after an arc fault in order to remove residues of the sometimes toxic decomposition products. If other appliances are located there which are not separated from the atmosphere of the inside of the tower in a gastight fashion, the gases and decomposition products which are formed in the event of an arc fault are also distributed in these appliances, entailing additional expenditure on cleaning. Depending on the degree of contamination of the atmosphere inside the tower, it may also be necessary to specify people to enter the tower only if they are wearing protective clothing, which represents additional expenditure for restoring the wind turbine to operation.

A second option for the pressure relief consists in collecting the gases and decomposition products formed in the event of an arc fault in a duct and then discharging them into the external environment through the external wall of the tower of the wind turbine. However, the opening in the external wall of the tower constitutes an undesired mechanical weakening of the structure. It is also difficult to seal off the external atmosphere in the vicinity of the tower from the interior of the tower or from the inside of the housing for the switchgear. Problems can occur due to the penetration of moisture, such as on the pressure-relief device which forms the separation between the external atmosphere and the interior of the housing of the switchgear. Because the pressure-relief device in offshore wind turbines is permanently exposed to an aggressive marine climate, the components of the pressure-relief device are liable to corrosion.

A switchgear cell arrangement for medium-voltage switchgear is known, for example, from EP 0 620 626 A1 in which, in the event of a disturbance in one of the cells, a relief of pressure can be triggered by pivotably mounted pressure-relief valves in the roof so as to drain off the pressurized gases into the surroundings of the switchgear.

Medium-voltage switchgear is also known from the document U.S. Pat. No. 7,054,143 B2 in which pressurized gases are drained off via a discharge duct attached to the roof of the housing of the switchgear.

Medium-voltage switchgear is known from the document WO98/19377, in which an arc fault absorption device is provided, the absorption device being designed on the rear and/or lateral region of the medium-voltage switchgear in order to discharge pressurized gases or decomposition products.

Furthermore, the document EP 1 477 668 A1 discloses the arrangement of a wind turbine power unit inside a tower of a wind turbine, the wind turbine power unit being arranged on the foundation of the tower.

SUMMARY

An exemplary wind turbine for providing electrical energy is disclosed. The wind turbine comprising: a tower with a tower interior; switchgear for switching an electric current, the switchgear being arranged in a housing in the tower interior; a discharge chamber separate from the tower interior; and a pressure-relief device which is connected between an inside of the housing and the discharge chamber so that, if a difference in pressure between the inside of the housing of the switchgear and the discharge chamber exists, a release of an excess pressure into the discharge chamber is triggered.

An exemplary wind turbine for providing electrical energy is disclosed. The wind turbine comprising: a tower; switchgear that switches electric current, the switchgear being arranged in a housing within the tower; a discharge chamber; and a pressure-relief device that releases excess pressure in the discharge chamber, the pressure-relief device connecting the switchgear housing and the discharge chamber.

BRIEF DESCRIPTION OF THE DRAWINGS

Exemplary embodiments are explained in detail below in conjunction with the attached drawings, in which.

DETAILED DESCRIPTION

Figure 1:
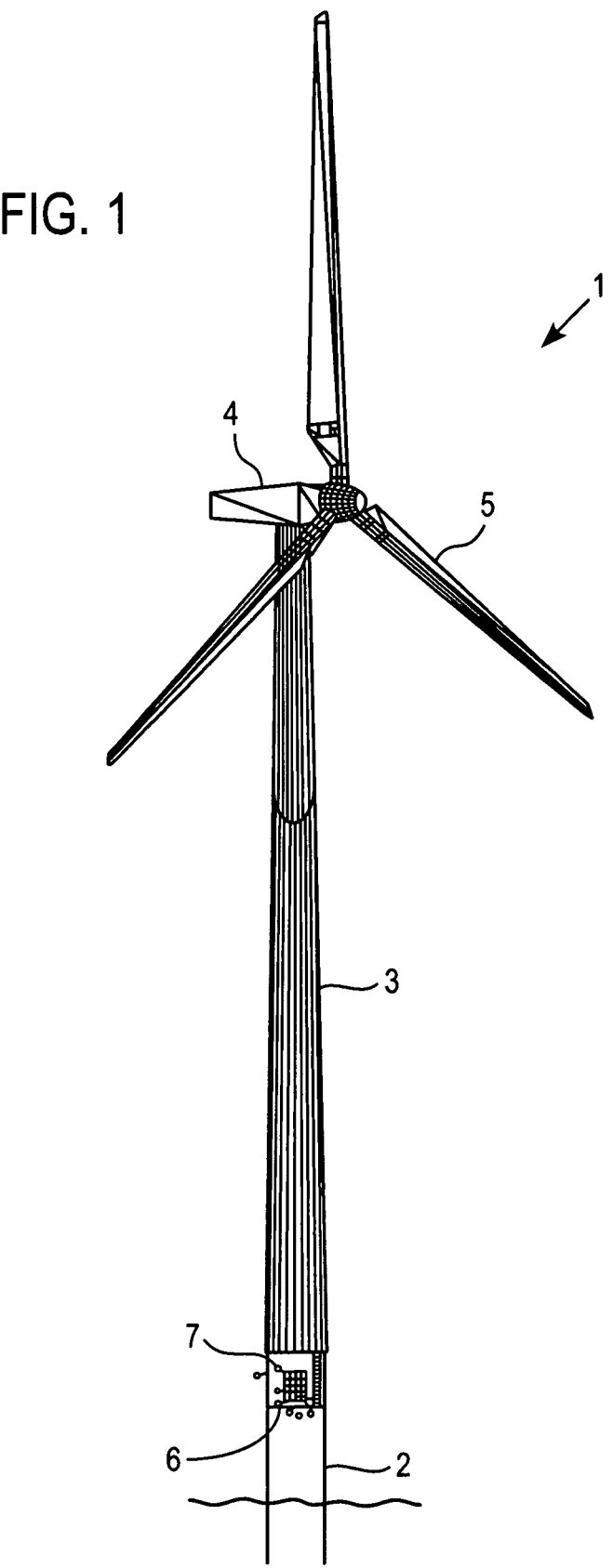
FIG. 1 shows a schematic view of an offshore wind turbine with a view in section of a base region in which medium-voltage switchgear in accordance with an exemplary embodiment of the present disclosure.

Exemplary embodiments of the present disclosure provide a wind turbine, such as an offshore wind turbine, with switchgear, in which pressure is relieved and gases and decomposition products occurring in the event of an arc are prevented from remaining inside the enclosed environment and moreover the structure of the outer shell is prevented from being weakened.

The disclosure relates to a wind turbine for providing electrical energy. The wind turbine includes a tower with a tower interior; switchgear, such as medium-voltage switchgear, for switching an electric current, the switchgear being arranged in a housing in the tower interior; a discharge chamber separate from the tower interior; a pressure-relief device which is connected between the inside of the housing and the discharge chamber so that, in the event of a difference in pressure between the inside of the housing of the switchgear and the discharge chamber, it triggers the release of an excess pressure into the discharge chamber.

Exemplary embodiments of the present disclosure provide a wind turbine that includes relieving the pressure in the switchgear by draining off gases and decomposition products occurring in the event of a fault into the discharge chamber. The discharge chamber can be separated from the tower interior in which the switchgear is situated and can have a sufficiently high volume in order to contain the pressurized gases. As a result, it is possible to avoid discharging the gases into the tower interior, so that any additional devices arranged there or any people present there are not harmed by the gases which are often toxic. Moreover, an exemplary wind turbine as provided in the present disclosure can obviate a user of pressure-relief ducts in an external wall of the tower. These ducts can adversely affect the structural stability of the external wall.

An exemplary switchgear disclosed herein can also be provided with a device for extinguishing an arc caused by the switching of the electric current.

According to an exemplary embodiment of the present disclosure, the tower interior can be delimited by a partition, the discharge chamber being defined by the partition and an internal volume of a foundation on which the tower stands.

The pressure-relief device can be arranged in the partition in the region above which the housing for the switchgear is arranged.

In an exemplary embodiment the switchgear can have multiple switch devices which are arranged above respective cable connection spaces, the housing for the switchgear being connected to the region of the partition by means of a frame, the frame forming a gas discharge duct for feeding gases and decomposition products, which are passed through the cable connection spaces, to the pressure-relief device.

According to another embodiment, the pressure-relief device can have a sealing plate for sealing an opening, the sealing plate being retained by retaining elements which yield under a predetermined breaking load, whereupon the sealing plate unblocks the opening.

The sealing plate can also be connected via a grounding conductor to a frame in which the opening is provided.

The volume of the discharge chamber can be at least 10 times the volume of the housing.

According to an exemplary embodiment, the wind turbine can be designed as an offshore wind turbine.

Figure 2:
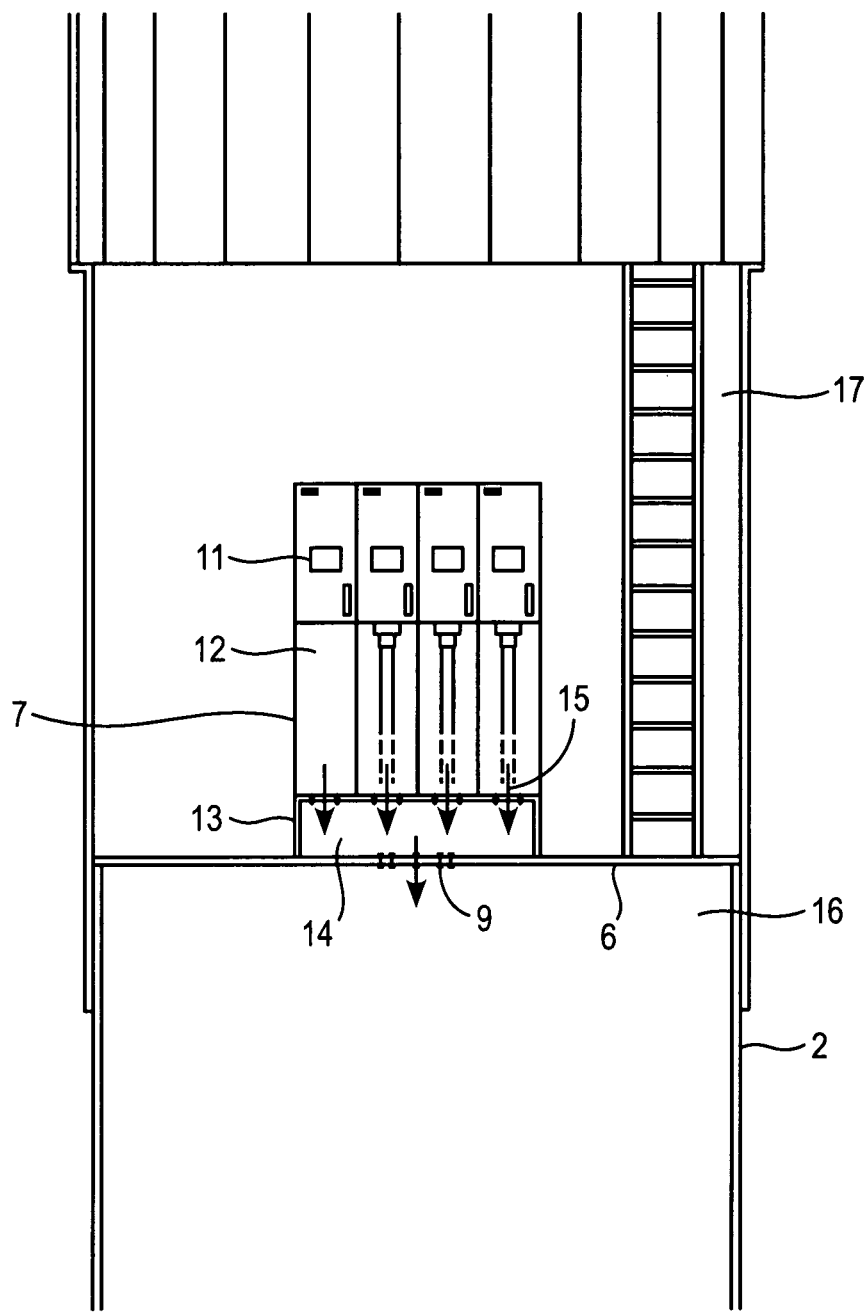
FIG. 2 shows a detailed front view of the region of the interior of the wind turbine in which the switchgear is arranged in accordance with an exemplary embodiment of the present disclosure.

Different views of an offshore wind turbine 1 are shown in FIGS. 1 to 4. FIG. 1 shows a schematic view of an offshore wind turbine with a view in section of a base region in which medium-voltage switchgear in accordance with an exemplary embodiment of the present disclosure. FIG. 2 shows a detailed front view of the region of the interior of the wind turbine in which the switchgear is arranged in accordance with an exemplary embodiment of the present disclosure. The wind turbine 1 includes a foundation 2 on which stands a tower 3 which is cylindrical and tapers upwards. A nacelle 4, which can move about the vertical axis of the cylindrical tower 3 and on which a multi-blade wind wheel 5 is arranged, is located at the upper end of the tower 3 and the opposite end to the foundation 2.

Figure 3:
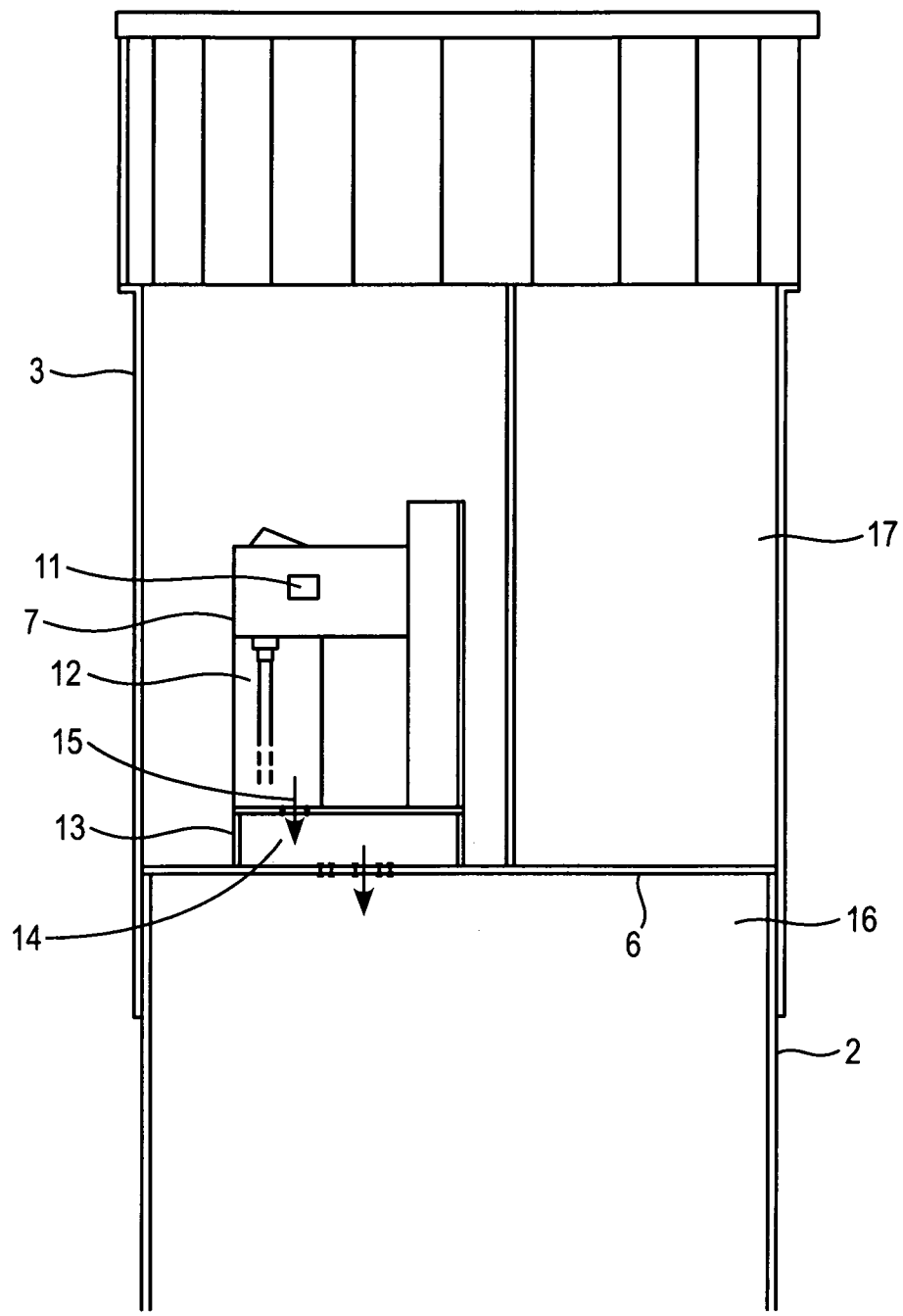
FIG. 3 shows a detailed side view of the region of the interior of the wind turbine in which the switchgear is arranged in accordance with an exemplary embodiment of the present disclosure.
Figure 4:
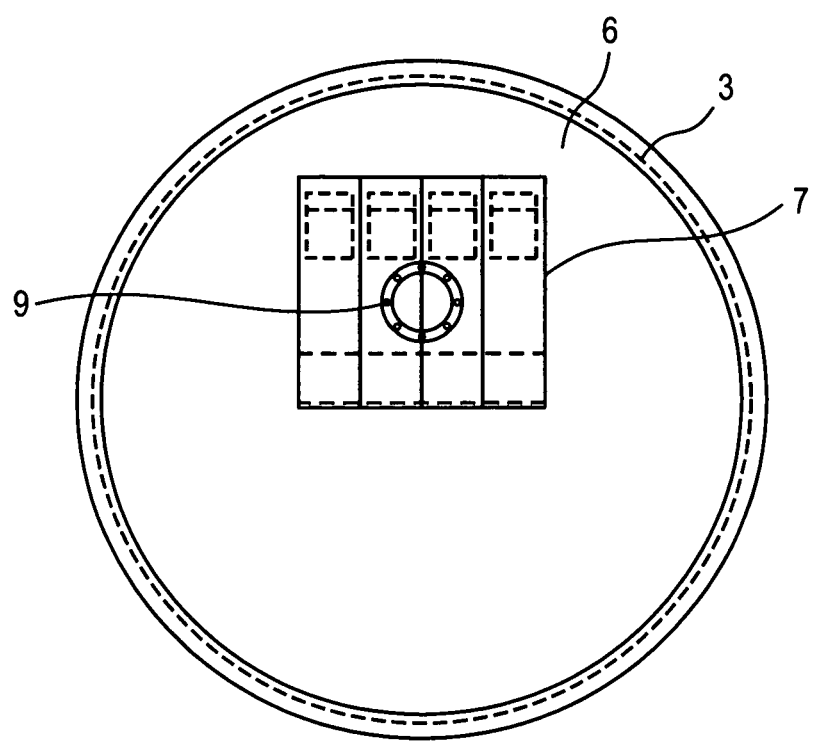
FIG. 4 shows a view in section at the level of the partition that separates the interior of the tower of the wind turbine and a discharge area from each other in accordance with an exemplary embodiment of the present disclosure.

FIG. 3 shows a detailed side view of the region of the interior of the wind turbine in which the switchgear is arranged in accordance with an exemplary embodiment of the present disclosure. FIG. 4 shows a view in section at the level of the partition that separates the interior of the tower of the wind turbine and a discharge area from each other in accordance with an exemplary embodiment of the present disclosure. The foundation of the wind turbine 1 is pile-driven or inserted into or placed on the seabed and projects above the surface of the sea 10 by a few meters, for example 6 to 7 meters. The foundation 2 can be made from steel or a waterproof concrete or the like.

The tower 3 can be connected rigidly and water-tightly to the foundation 2 projecting above the surface of the sea and essentially constitutes a vertical extension of the foundation 2. The foundation 2 can have a hollow space that is closed at the top by a partition 6. The partition 6 simultaneously serves to seal off the bottom of the tower interior 17 of the tower 3.

Medium-voltage switchgear 7, which has load switches for switching the electrical energy generated by the generator in the nacelle 4, for converting the current generated and for otherwise controlling the electrical energy, is arranged on the partition 6. The medium-voltage switchgear can also be provided with a load separator which allows individual stretches of cable connecting multiple wind turbines to be separated, for example in the event of a fault or for maintenance, without having to disconnect working wind turbines from the medium-voltage grid that connects together the wind turbines of a wind farm.

When load switches are switched under load, arcs often occur which are extinguished in arcing chambers. The arc is extinguished, for example, using gas, pressurized air or liquids. In the event of a fault, the load switches can be triggered in the medium-voltage switchgear 7 so that an arc fault occurs. These arc faults cause high temperatures and, in conjunction with the gases or liquids provided for the extinguishing, result in toxic or harmful gases or decomposition products. Because of chemical reactions and the heating of the gases inside the housing of the medium-voltage switchgear 7, a high pressure prevails there.

The medium-voltage switchgear 7 has a housing, the inside of which is gas-tightly separated or sealed off from the surroundings of the medium-voltage switchgear 7. The toxic or harmful gases and decomposition products that result when an arc fault occurs generate an elevated pressure inside the housing. This excess pressure should be reduced in order, on the one hand, to protect the housing of the medium-voltage switchgear 7 from damage and, on the other hand, to allow access to the medium-voltage switchgear 7 so that measures can be taken to restore the medium-voltage switchgear 7 to operation after an arc fault.

A pressure-relief device 9 is provided for discharging the toxic or harmful gases and decomposition products. The pressure-relief device 9 is constructed such that, when an excess pressure occurs inside the housing of the medium-voltage switchgear 7, it is discharged into a discharge chamber 16 which is separate from or separated from the tower interior 17. Such a discharge chamber 16 can, for example, be formed below the tower interior 17 with the partition 6 and the foundation 2. The discharge chamber 16 so formed usually has a large volume compared with the volume of the inside of the housing of the medium-voltage switchgear 7 (for example, a volume that is larger by a factor of 10 or more), and a sufficient wall thickness so that the gases and decomposition products formed in the medium-voltage switchgear 7 and an elevated pressure can be contained.

In an offshore wind turbine where the height of the foundation 2 above the surface of the sea is, for example, 6 to 7 meters and has a diameter of approximately 4 m, the discharge chamber 16 which is formed in the foundation 2 has a sufficient volume to contain the pressurized gases from the inside of the housing of the medium-voltage switchgear 7. In addition, the foundation 2 is formed by a steel tube or as a concrete foundation with a large wall thickness which can readily withstand the resulting pressure.

This discharge chamber 16 is also not used and cannot be accessed by people, and moreover does not contain other devices which might be adversely affected by the gases discharged therein. The medium-voltage switchgear 7 can have a structure in which corresponding switch devices 11 with the load switches and arc chutes are provided above a cable connection space 12. If harmful gases and decomposition products occur with excess pressure in the event of an arc fault because of the vaporization of material and the development of heat, they can be drained off via the cable connection space 12 to the bottom of the medium-voltage switchgear 7.

A base frame 13 arranged gas-tightly on the partition 6 may be provided which can have the cross-sectional area of the housing of the medium-voltage switchgear 7. The housing is placed gas-tightly on top of the base frame 13 so that the base frame 13 can receive the gases which pass through the cable connection spaces 12 and the connecting openings 15 provided at its lower end, and thus forms a gas discharge duct 14 for the gases which should be discharged from the multiple switch devices 11.

The base frame 13 is arranged above a pressure-relief device 9 in the partition 6 so that, in the event of a fault, the excess pressure prevailing in the gas discharge duct 14 is applied to the pressure-relief device 9 and may trigger it.

Instead of guiding the gases and decomposition products through the cable connection spaces 12 and possibly through the gas discharge duct 14 to the pressure-relief device 9, a corresponding gas line can also be provided between the interior of the housing in which the switch device is provided and the pressure-relief device 9. The gas line can connect an opening in the side wall or on the top of the housing to the pressure-relief device 9.

The pressure-relief device 9 can, for example, include a bursting disk or pressure-relief valve. A bursting disk is a disk which, in the untriggered state, gas-tightly separates the volume of the inside of the housing of the medium-voltage switchgear 7 from the volume of the discharge chamber 16 in the foundation and breaks in the event of a pressure difference between the volumes, corresponding to a defined triggering pressure, being exceeded.

A pressure-relief valve is a fixed, often pivotably attached valve that seals an opening between the volumes. The valve is held in the closed position by a triggering mechanism. The triggering mechanism is designed in such a way that it releases the valve as soon as the pressure difference corresponding to a defined triggering pressure exceeds a predetermined threshold value.

Figure 5A:
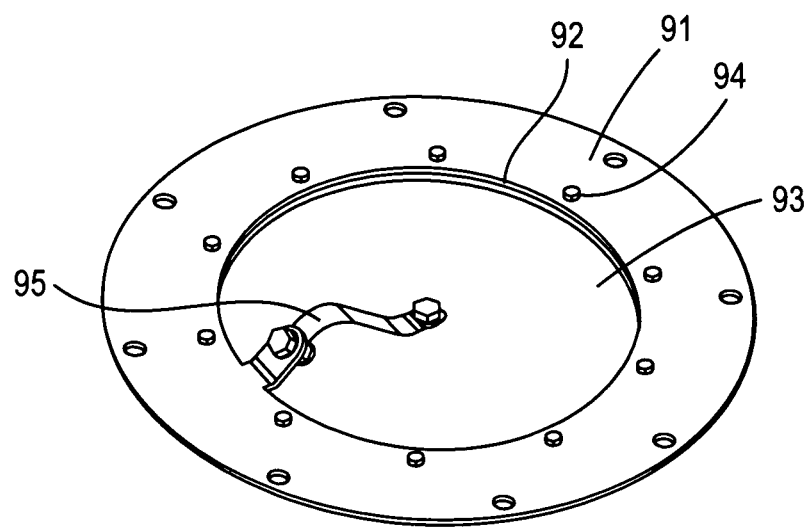
FIGS. 5a-5b show different views of a pressure-relief plate for use in the arrangement in FIGS. 1-4 in accordance with an exemplary embodiment of the present disclosure.
Figure 5B:
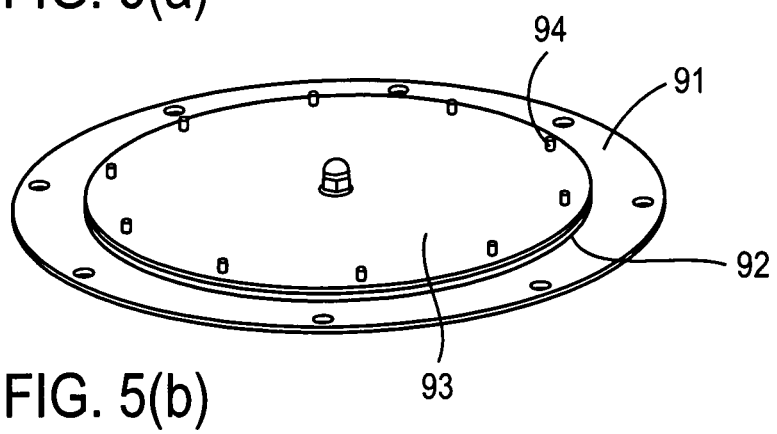

FIGS. 5a-5b show different views of a pressure-relief plate for use in the arrangement in FIGS. 1-4 in accordance with an exemplary embodiment of the present disclosure. A further option for the design of a pressure-relief device 9 is shown in FIGS. 5a and 5b. The pressure-relief device 9 in FIGS. 5a to 5c shows an essentially disk-shaped frame 91 with a central opening 92 in which a sealing plate 93 is fastened. The sealing plate 93 is fastened to the frame 91 by means of appropriate retaining elements 94 such as, for example, screw or pin connectors, which represent predetermined breaking points. The retaining elements 94 are designed in such a way that they yield at a specified force and consequently the sealing plate 93 detaches from the frame and forms an opening through which the pressurized gases and decomposition products can escape. The specified force occurs when a pressure difference acts on the sealing plate 93.

Such a design has the advantage that the frame 91 and the sealing plate 93 are not damaged, so that only new retaining elements 94 with which the sealing plate 93 is fastened to the frame are then specified in order to restore the pressure-relief device 9 to operation. By selecting the retaining elements 94, the triggering pressure can be selected by choosing a corresponding breaking load of the retaining elements 94.

A grounding cable 95, which is fastened to both the sealing plate 93 and the frame 91 for example by screw connectors, can be provided in a suitable fashion between the frame 91 and the sealing plate 93. In addition to electrically grounding the sealing plate 93, the grounding cable 95 can, when the pressure-relief device 9 is triggered, simultaneously prevent the sealing plate 93 from completely detaching from the frame 91, thus leading to a task of retrieving the sealing plate 93 from the discharge chamber 16 at great expense.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE NUMERALS 1 wind turbine
2 foundation
3 tower
4 nacelle
5 wind wheel
6 partition
7 medium-voltage switchgear
9 pressure-relief device 11 switch device
12 cable connection space
13 base frame
14 gas discharge duct
15 connecting openings
16 discharge chamber
17 tower interior
91 frame
92 opening
93 sealing plate
94 retaining element
95 grounding cable

What is claimed is:

1. A wind turbine for providing electrical energy, comprising:
    a tower with a tower interior;
    switchgear for switching an electric current, the switchgear being arranged in a housing in the tower interior;
    a discharge chamber separate from the tower interior; and
    a pressure-relief device which is connected between an inside of the housing and the discharge chamber so that, if a difference in pressure between the inside of the housing of the switchgear and the discharge chamber exists, a release of an excess pressure into the discharge chamber is triggered,
    wherein a sealing plate is connected via a grounding conductor to a frame in which an opening is provided.

2. The wind turbine as claimed in claim 1, wherein the switchgear includes a device for extinguishing an arc caused by a switching of the electric current.

3. The wind turbine as claimed in claim 1, wherein the tower interior is delimited by a partition, the discharge chamber being defined by the partition and an internal volume of a foundation on which the tower stands.

4. The wind turbine as claimed in claim 3, wherein the pressure-relief device is arranged in the partition in a region above which the housing for the switchgear is arranged.

5. The wind turbine as claimed in claim 3, wherein the switchgear has multiple switching devices which are arranged above respective cable connection spaces, the housing for the switchgear being connected to the region of the partition by means of a frame, the frame forming a gas discharge duct for feeding at least one of gases and decomposition products, which are passed through the cable connection spaces, to the pressure-relief device.

6. The wind turbine as claimed in claim 1, wherein the pressure-relief device includes the sealing plate for sealing the opening, the sealing plate being retained by retaining elements which yield under a predetermined breaking load, whereupon the sealing plate unblocks the opening.

7. The wind turbine as claimed in claim 1, wherein a volume of the discharge chamber is at least 10 times the volume of the housing.

8. The wind turbine as claimed in claim 1, wherein the switchgear is a medium-voltage switchgear.

9. The wind turbine as claimed in claim 1, wherein the tower and discharge chamber are in a marine climate.

* * * * *